US012091076B2

(12) United States Patent
Huber (10) Patent No.: US 12,091,076 B2
(45) Date of Patent: Sep. 17, 2024

(54) ADJUSTMENT DRIVE FOR A STEERING COLUMN, AND STEERING COLUMN FOR A MOTOR VEHICLE (71) Applicants: thyssenkrupp Presta AG, Eschen (LI); thyssenkrupp AG, Essen (DE)

(72) Inventor: Sebastian Huber, Goefis (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 107 days.

(21) Appl. No.: 17/801,039

(22) PCT Filed: Feb. 16, 2021

(86) PCT No.: PCT/EP2021/053694
§ 371 (c)(1),
(2) Date: Aug. 19, 2022

(87) PCT Pub. No.: WO2021/165218
PCT Pub. Date: Aug. 26, 2021

(65) Prior Publication Data
US 2023/0084605 A1 Mar. 16, 2023

(30) Foreign Application Priority Data
Feb. 20, 2020 (DE) .................. 10 2020 202 196.1

(51) Int. Cl.
F16H 25/24 (2006.01)
B62D 1/181 (2006.01)
(Continued)

(52) U.S. Cl.
CPC ............ B62D 1/181 (2013.01); B62D 1/183 (2013.01); F16H 25/24 (2013.01); F16H 2025/2084 (2013.01); F16H 25/2418 (2013.01)

(58) Field of Classification Search
CPC ....... F16H 2025/204; F16H 2025/2028; F16H 25/2454
See application file for complete search history.

(56) References Cited

U.S. PATENT DOCUMENTS

| 6,041,671 A | 3/2000 | Erikson et al. | |
| 11,635,127 B2 * | 4/2023 | Niermann | F16H 25/24 |
| | | | 74/424.71 |

(Continued)

FOREIGN PATENT DOCUMENTS

| CN | 1118811 A | 3/1996 |
| CN | 1829628 A | 9/2006 |

(Continued)

OTHER PUBLICATIONS

English Translation of International Search Report Issued in PCT/EP2021/053694 dated May 19, 2021.

Primary Examiner — Gregory Robert Weber
(74) Attorney, Agent, or Firm — thyssenkrupp North America, LLC (57) ABSTRACT An adjusting drive for a steering column for a motor vehicle may include a threaded spindle with an external thread that engages in a spindle nut and a drive unit that is coupled to the threaded spindle or the spindle nut such that the threaded spindle and the spindle nut are able to be rotatably driven relative to one another by overcoming a screw resistance. To permit an optimized adjustment over the entire adjusting region, the threaded spindle includes at least one actuator portion and at least one transition portion. The transition portion is configured such that the screw resistance of the spindle nut is lower in the transition portion than in the actuator portion.

14 Claims, 5 Drawing Sheets (51) Int. Cl.
*B62D 1/183* (2006.01)
*F16H 25/20* (2006.01)

(56) References Cited

U.S. PATENT DOCUMENTS

| | | | |
|---|---|---|---|
| 11,697,449 B2 * | 7/2023 | Ryne | B62D 1/187 74/484 R |
| 2005/0252320 A1 | 11/2005 | Hartig et al. | |
| 2006/0154536 A1 | 7/2006 | Rosenkranz | |
| 2009/0120745 A1 | 5/2009 | Kondo et al. | |
| 2017/0015345 A1 | 1/2017 | Galehr | |
| 2017/0097071 A1 | 4/2017 | Galehr | |
| 2019/0210633 A1 | 7/2019 | Derocher et al. | |
| 2020/0072329 A1 | 3/2020 | Reichmuth et al. | |
| 2020/0346682 A1 | 11/2020 | Forte et al. | |
| 2021/0171085 A1 | 6/2021 | Huber et al. | |
| 2021/0362768 A1 | 11/2021 | Huber et al. | |

FOREIGN PATENT DOCUMENTS

| | | |
|---|---|---|
| CN | 101351656 A | 1/2009 |
| CN | 204677717 U | 9/2015 |
| CN | 106232455 A | 12/2016 |
| CN | 207261441 U | 4/2018 |
| CN | 110785584 A | 2/2020 |
| DE | 201 03 040 U1 | 7/2001 |
| DE | 102004023354 A1 | 12/2005 |
| DE | 102011121765 A1 | 6/2013 |
| DE | 10 2017 207 561 A1 | 7/2017 |
| DE | 10 2018 217 960 A1 | 4/2020 |
| EP | 1 084 355 A1 | 3/2001 |
| GB | 2289231 | 11/1995 |
| JP | 2009248703 A | 10/2009 |
| KR | 20080105755 A | 12/2008 |
| WO | 2019145281 A1 | 8/2019 |
| WO | 2019243356 A1 | 12/2019 |

* cited by examiner

ADJUSTMENT DRIVE FOR A STEERING COLUMN, AND STEERING COLUMN FOR A MOTOR VEHICLE

CROSS REFERENCE TO RELATED APPLICATIONS

This application is a U.S. National Stage Entry of International Patent Application Serial Number PCT/EP2021/053694, filed Feb. 16, 2021, which claims priority to German Patent Application No. DE 10 2020 202 196.1, filed Feb. 20, 2020, the entire contents of both of which are incorporated herein by reference.

FIELD

The present disclosure generally relates to steering columns, including adjustment drives for steering columns.

BACKGROUND

Steering columns for motor vehicles have a steering shaft with a steering spindle, a steering wheel being attached to the rear end thereof in the direction of travel facing the driver in order to introduce a steering command from the driver. The steering spindle is rotatably mounted about its longitudinal axis in an actuating unit which is held by a supporting unit on the vehicle body. A longitudinal adjustment may be carried out by an inner jacket tube of the actuating unit, also denoted in short as the jacket tube, being displaceably received in a telescopic manner in the direction of the longitudinal axis in a jacket unit, also denoted as a guide box, outer jacket tube or boxed swing arm, which is connected to the supporting unit. A vertical adjustment may be implemented by the actuating unit, or a jacket unit receiving this actuating unit, being pivotably mounted on the supporting unit. The adjustment of the actuating unit in the longitudinal or vertical direction permits the setting of an ergonomically comfortable steering wheel position relative to the driver's position in the operational position, also denoted as the driving position or operating position, in which a manual steering intervention may be carried out.

In the prior art, for adjusting the actuating unit relative to the supporting unit it is known to provide a motorized adjusting drive with a drive unit comprising a drive motor which is connected—generally via a gear mechanism—to a spindle drive, which comprises a threaded spindle screwed into a spindle nut. By means of the drive unit, the threaded spindle and the spindle nut are able to be rotatably driven relative to one another about the spindle axis, whereby depending on the rotational direction these components may be moved toward one another or away from one another in a translatory manner in the direction of the spindle axis. In one embodiment, in a so-called rotary spindle drive, the threaded spindle is able to be rotatably driven by the drive unit, which is fixedly connected to the actuating unit or the supporting unit, about its threaded spindle axis and engages in the spindle nut which is fixedly attached to the supporting unit or the actuating unit relative to rotation about the spindle axis. Axially, i.e. in the direction of the spindle axis, the threaded spindle is supported via the coupling portion on the supporting unit or the actuating unit and the spindle nut is accordingly supported on the actuating unit or the supporting unit, so that driving the threaded spindle in a rotational manner brings about a translatory adjustment of the supporting unit and the actuating unit relative to one another. In an alternative embodiment, which is also denoted as a plunger spindle drive, relative to a rotation about its spindle axis the threaded spindle is coupled with its coupling portion in a non-rotational manner to the supporting unit or the actuating unit, and the spindle nut is correspondingly mounted so as to be rotatable on the actuating unit or the supporting unit, but fixed in the direction of the spindle axis. As in the first embodiment, the threaded spindle is axially supported via the coupling portion on the supporting unit or the actuating unit in the direction of the spindle axis, and the spindle nut is supported on the actuating unit or the supporting unit, so that the threaded spindle is displaceable by the drive unit in a translatory manner in the direction of the spindle axis. In both embodiments, the spindle drive forms a motorized adjusting drive which is effective between the supporting unit and the actuating unit, the actuating unit being able to be adjusted thereby for adjustment relative to the supporting unit. A generic adjusting drive is disclosed, for example, in DE 10 2018 207 561 A1.

For implementing a longitudinal adjustment of the actuating unit in the direction of the longitudinal axis of the steering spindle, a spindle drive of an adjusting drive may be arranged between the jacket tube of the actuating unit and a jacket unit which receives this spindle drive in a longitudinally displaceable manner in the axial direction and which is connected to the supporting unit, and wherein the spindle axis may be oriented substantially parallel to the longitudinal axis.

For the vertical adjustment, an adjusting drive may be arranged between the supporting unit and an actuating unit which is mounted in a vertically-adjustable manner thereon.

A motorized longitudinal and vertical adjustment may be configured individually or in combination on a steering column.

In manual driving mode, for a comfortable manual steering intervention within an operating region which forms a sub-region of the entire possible adjusting region or adjusting path and is also denoted as the operational or comfort region, the steering wheel may be adapted by means of the adjusting drive or the adjusting drives for adapting to the individual driver's position. If a manual steering intervention is not required, for example in autonomous driving mode of an autonomously driven vehicle and/or for boarding and disembarking from the vehicle, the steering column may be retracted or compressed as far as possible in the longitudinal or vertical direction in order to bring the steering wheel into a stowed position outside the operating region, so that the vehicle interior may be freed up for another use. A transition region, in which a steering intervention is not provided, is located between the operating region and the stowed position. For stowing, or conversely for deployment in the operating position, the steering column has to be adjusted by means of the adjusting drive from the stowed position through the transition region into the operating region or vice versa.

Within the operating region, the adjusting drive has to have a high degree of stiffness and the development of noise is intended to be avoided, wherein a relatively low adjusting speed is advantageous for an accurate and convenient setting of the steering wheel position. In the transition region, an adjusting speed is intended to be as high as possible in order to permit a rapid stowage and deployment of the steering wheel.

In order to implement a high degree of stiffness, it is disclosed, for example, in the aforementioned DE 10 2017 207 561 A1 to tension the external thread of the threaded spindle with little clearance or without clearance in the internal thread of the spindle nut. As a result, however, the friction between the external and internal thread is relatively high, and thus also the screw resistance associated therewith, also denoted as the screwing torque, which indicates the relative torque which has to be applied by the drive unit between the threaded spindle and the spindle nut in order to rotate the spindle nut in unloaded threaded engagement, for an axial displacement relative to the external thread. A drawback here is that a high drive power of the adjusting drive has to be provided in order to permit a high adjusting speed in the transition region. As a result, the adjusting drive becomes heavy, bulky and has a high energy consumption. A small-sized adjusting drive has the drawback that only a slow adjustment—as in the operating region—is possible, even in the transition region, which is not acceptable during operation. In this regard, there is a conflict of objectives relative to achieving the different requirements.

Thus a need exists for an improved adjusting drive that permits an optimized adjustment over the entire adjusting region.

DETAILED DESCRIPTION

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In an adjusting drive for a steering column for a motor vehicle comprising a threaded spindle, which engages with an external thread in a spindle nut, and a drive unit which is coupled to the threaded spindle or the spindle nut such that the threaded spindle and the spindle nut are able to be rotatably driven relative to one another by overcoming a screw resistance, according to the invention it is provided that the threaded spindle has at least one actuator portion and at least one transition portion, wherein the transition portion is configured such that the screw resistance of the spindle nut is lower in the transition portion than in the actuator portion.

The threaded spindle, which extends in the axial direction along its spindle axis, according to the invention has differently designed threaded portions, i.e. longitudinal portions of the external thread, wherein at least one threaded portion which extends longitudinally over a sub-region of the external thread is designed as an actuator portion which is also denoted as the actuating portion. At least one further threaded portion outside the actuator portion is designed as a transition portion, also denoted as the intermediate portion.

The screw resistance, which is also denoted as the screwing torque, is defined by the relative torque which is generated by the adjusting drive and has to be applied between the threaded spindle and the spindle nut in order to rotate the spindle nut in unloaded threaded engagement relative to the external thread and to generate a relative axial displacement. The screwing torque is significantly influenced by the frictional forces which act between the internal and external thread. The screw resistance is indirectly proportional to the efficiency of the spindle drive formed by the spindle nut and the threaded spindle.

According to the invention, a relatively high screwing torque is acceptable in the actuator portion. This permits the external thread of the threaded spindle and the internal thread of the spindle nut to be optimized in a targeted manner relative to increasing the stiffness of the threaded connection and reducing possible noise development. For example, a thread clearance which is as small as possible may be provided, or a tensioning of the internal and external thread, whereby the stiffness is increased and thus also the screwing torque associated therewith.

For the above reasons, an adjustability which is as simple as possible is desired in the transition portion, at least a simpler adjustability than in the actuator portion. According to the invention, this may be implemented by an adaptation of the external thread to the internal thread of the spindle nut, by which a reduction of the screwing torque is generated. In practice, according to the invention it is provided that the screwing torque is lower in the transition region than in the actuator portion. For example, the screwing torque may be predetermined by the friction of the thread. The friction in the transition portion, for example, may be reduced by a thread clearance which is increased relative to the actuator portion, or by an elimination or a reduction of a tension of the internal and external thread provided in the actuator portion, whereby the thread friction may also be reduced compared with the actuator portion.

Other measures which are suitable for reducing the thread friction and thus the screw resistance by the design of the external thread of the threaded spindle in the longitudinal portion of the transition portion relative to the actuator portion, for example by different materials, surface structures, geometric shapes and/or dimension of the threads, or the like, are also conceivable and possible. In this case, a reduction of the stiffness may be accepted without difficulty, since the spindle nut only briefly passes the transition portion when the steering wheel is stowed or deployed and there is no steering input or torque transmission during this time.

By the simpler adjustability due to the lower screw resistance in the transition region, an advantageously higher linear adjusting speed of the adjusting drive may be implemented by a drive unit with the same drive power. Alternatively, a lower drive power may be provided. An advantage of the invention is that the actuator portion and the transition portion may be optimized independently of one another regarding the specific requirements. As a result, the conflict of objectives present in the prior art relative to a high stiffness in the operating region of the steering column and a high adjusting speed in the transition portion may be achieved without unsatisfactory compromises.

A further advantage is that an optimization of existing constructions of adjusting drives is possible with little effort by using a threaded spindle which is designed according to the invention. In this context, by a corresponding design of the actuator and transition portions, it is also possible to adapt in a simple manner and with little effort an adjusting drive to different designs of steering columns which, for example, have actuator portions and transition portions of different lengths. It is also advantageous that the change of the screw resistance according to the invention takes place automatically and without additional switching elements, when during adjustment the spindle nut passes over the threaded spindle from the actuator portion into the transition portion or vice versa.

The actuator portion preferably corresponds to an adjusting region of the steering column in which a high stiffness and low clearance is required, for example the operating region as mentioned in the introduction and/or also a stowing region, which denotes an adjusting region which, when viewed from the operating region, is located at the other end of the adjusting path and in which the stowed position is located. Also in the stowing region, it is advantageous that undesired vibrations and the development of noise may be prevented by the low clearance when the steering column is stowed. The length of an actuator portion may preferably correspond to the length of the operating region of a longitudinally adjustable steering column which has an adjusting drive according to the invention as the longitudinal adjusting drive. A further actuator portion may accordingly correspond to a stowing region extending in the direction of the longitudinal axis.

The transition portion corresponds to an adjusting region of the steering column in which a higher adjusting speed is desired than in the operating region, for example a transition region, as mentioned in the introduction, between the operating and stowing region of a steering column. The stiffness and the thread clearance are of secondary importance in the transition region. Due to the invention, an optimization regarding the smooth adjustability and high adjusting speed may be implemented here.

The actuator portion and transition portion are preferably configured via defined axial or longitudinal portions of the external thread and preferably extend over a plurality of threads, particularly preferably over the same or a greater number of threads than the internal thread of the spindle nut.

An adjusting drive according to the invention may be used as a longitudinal adjusting drive of a longitudinally adjustable steering column, wherein the threaded spindle is arranged substantially parallel to the longitudinal axis of the steering column and the spindle nut and the threaded spindle in each case are connected to the jacket tubes which are adjustable telescopically relative to one another in the longitudinal direction. It is also possible that an adjusting drive according to the invention is used as a vertically adjustable drive in a vertical direction, transversely to the longitudinal axis between the actuating unit and the supporting unit of a vertically adjustable steering column. At least one adjusting drive according to the invention may also be used on a longitudinally and vertically adjustable steering column.

It is equally possible to use a threaded spindle according to the invention in a plunger spindle drive or in a rotary spindle drive.

An actuator portion may preferably be arranged in an end region of the threaded spindle. This arrangement corresponds to the operating region of the steering column and generally also to the stowing region which are both located in the adjusting regions in the vicinity of the end positions in the maximum extended or maximum retracted end position of the adjusting path. In these adjusting regions of the steering column, the spindle nut in each case is located in an end region of the threaded spindle.

It may be provided that at least two actuator portions are provided, a transition portion being arranged therebetween. The two actuator portions preferably correspond to the operating region which is located at the one end region of the adjusting path, to the rear in the direction of travel, and to the stowing region which is located at the other end of the adjusting path. Thus the two actuator portions may preferably be correspondingly arranged in the two end regions of the threaded spindle. The transition portion, which is designed according to the invention, is located between the actuator portions, said transition portion forming an intermediate portion which has to be passed by the spindle nut during stowage and deployment, when changing between the two actuator portions.

One possibility for implementing the invention is that the thread clearance in the transition region is greater than in the actuator portion. As the axial clearance between the thread flanks of the external thread and the internal thread is greater, the friction may be reduced, whereby the screw resistance may also be reduced. For example, in the transition portion the axial width of a thread tooth may be reduced, or the width of the thread increased. Such measures are simple to implement in terms of production technology and safe and effective during operation.

One advantageous embodiment of the invention provides that the actuator portion has at least one pretensioning element which is pretensioned against a thread of the spindle nut, and the transition portion has no pretensioning element or has a transition pretensioning element which is pretensioned to a lesser extent against the thread of the spindle nut than the pretensioning element of the actuator portion. The pretensioning element is configured in order to pretension the external thread of the threaded spindle in the internal thread of the spindle nut. By the pretensioning, the thread clearance is reduced and the stiffness of the spindle drive is increased. In this case, the thread friction and thus the screw resistance is also increased. Since the pretensioning element is omitted in the transition portion, here the pretensioning is absent.

As a result, the thread clearance is greater and the stiffness is lower than in the actuator portion. The thread friction and thus the screw resistance is, however, lower, whereby the above-described advantages according to the invention may be implemented. If the screw resistance in the transition region is intended to be reduced to a lesser extent than by omitting the pretensioning element, it is also conceivable here to provide a so-called transition pretensioning element which exerts a lower pretensioning force in the transition portion than the pretensioning element in the actuator portion, so that a reduced screw resistance is still implemented according to the invention. The omission or adaptation of the pretensioning element in the transition portion is able to be implemented with little effort structurally and in terms of production technology, and is operationally reliable.

It may be advantageously provided that the pretensioning element is arranged in the tooth profile of a helically encircling thread tooth of the external thread. The external thread has at least one helically encircling thread tooth with a tooth profile or tooth cross section defined by axial tooth flanks. The tooth profile in this case engages from inside in the corresponding thread in the internal thread of the spindle nut. A pretensioning element may be configured in the path or in a gap of the thread tooth and, when viewed from the tooth profile, is oriented axially in the thread, transversely to the path of the thread tooth. In this case, the pretensioning element is loaded with a pretensioning force against the opposing tooth flank of the internal thread, so that in effect the thread tooth is pretensioned in the thread of the internal thread transversely to its helical extension. The external thread is as a result axially pretensioned in the internal thread.

By the pretensioning force exerted by the pretensioning element, the tooth flanks of the threaded element and spindle nut may be tensioned relative to one another without clearance. This results in an adjustment which is smooth, low in vibration and accurate in the actuator portion. The level of pretensioning force determines the thread friction and thus the screw resistance. In this case, the level of screw resistance corresponds to the level of the pretensioning force. If the pretensioning element is omitted in the transition portion, the screw resistance is correspondingly reduced here.

One advantageous embodiment is that the pretensioning element has at least one spring element. By means of the spring element, the pretensioning element preferably may be axially pretensioned against a thread flank or tooth flank of the internal thread.

The spring element may preferably be configured on the threaded spindle so as to protrude into a thread of the external thread, preferably so as to protrude axially. The spring element may preferably be configured to be elastic transversely to the helical extension of the thread tooth, i.e. substantially in the axial direction, and may preferably have a spring tongue or a spring leaf radially protruding from the threaded spindle. When engaging in the spindle nut, the spring element may come into contact in a resilient manner with a tooth flank, or even into contact with the two tooth flanks of a thread of the internal thread of the spindle nut, and may be pretensioned by the pretensioning force exerted by the spring force. As a result, the threaded spindle may be elastically pretensioned in the internal thread of the spindle nut without clearance.

A spring element may be arranged or configured in the path of the thread tooth, or in a gap in the helical path of the thread tooth, which is formed for example by a continuous groove or flattened portion over a longitudinal portion of the external thread, preferably over a plurality of turns of the thread. A spring element, for example a radially protruding spring leaf or a spring body, may be arranged in the gap. In this case, the spring element may be wider in the relaxed state than the thread tooth and protrude in the axial direction into the thread between the turns of the thread tooth, such that it is axially tensioned against the tooth flank of the internal thread when the spindle nut, during adjustment, comes into engagement with the threaded portion having the pretensioning element, since the spring element is elastically deformed when brought into engagement. Advantageously, an optimally adapted design of the spring element is possible with little effort.

It is possible that the pretensioning element has a lubricant scraper. As the pretensioning element lies against the tooth flank with pretensioning, the defined sliding contact formed thereby may be advantageously used in order to distribute a lubricant used, for example a lubricating grease, uniformly over the thread during the adjustment. A lubricant scraper may be formed in a simple manner by an integrally formed edge or lip.

A further possibility for implementing the invention may provide that the external thread is designed to reduce friction in the transition portion and/or to increase friction in the actuator portion. By a different material pairing, surface structure, roughness or the like, the thread friction in the transition portion may also be reduced in a defined manner relative to the actuator portion, so that according to the invention the screw resistance of the spindle nut is lower in the transition portion than in the actuator portion.

An advantageous embodiment of the invention may provide that the threaded spindle has a core element which is fixedly surrounded at least in some portions in the coaxial direction by a threaded element which comprises the external thread.

The core element forms a force-absorbing structure of the threaded spindle and may preferably be configured from a material with a higher strength than the threaded element. Preferably, the core element consists of a metal material, preferably of steel or an aluminum alloy. As a result, a sufficiently high load-bearing capacity may be implemented with a relatively small material cross section.

The threaded element bears the external thread which engages in the corresponding internal thread of the spindle nut, i.e. is screwed in, and preferably may be configured from a plastics material. As a result, an advantageous sliding behavior and a relatively low and uniform screw resistance may also be implemented in the actuator region.

The core element is configured so as to be elongated in a bar-shape or rod-shaped manner and may preferably have a cylindrical or prismatic basic shape, preferably with a smaller cross section than the core cross section of the external thread of the threaded spindle. The core element according to the invention is surrounded by the threaded element at least in some sections relative to its axial length. The threaded element is fixedly and preferably unreleasably connected to the core element and thereby secured both against relative rotation in the peripheral direction and against axial displacement in the longitudinal direction.

It is advantageous that the core element is configured to be tubular at least in some sections. Since the core element is configured as a tubular hollow body, preferably as a hollow cylinder, weight may be saved. Moreover, heat may be effectively dissipated from the threaded spindle, both during production by plastics injection-molding and in adjusting mode, by a coolant at least partially flowing through the hollow body. Preferably, a hollow core element is produced from a metal material, for example as a steel tube.

A hollow core element also provides the advantageous possibility that the core element has a crimped deformation portion transversely to its longitudinal extension, in which a coupling portion is configured for connecting to the steering column. The coupling portion may be formed by a deformation portion, also denoted as the pressing portion, in which a tubular portion is plastically crimped flat, transversely to the axis.

The threaded element may be configured in a sleeve-shaped manner and fixed to the core element. The threaded element may be provided as a separate threaded sleeve, preferably made of plastics material, for example as a plastics injection-molded part. The threaded element has the external thread on its outer periphery and on the inside is connected to the core element in a manner which is rotationally locked and axially fixed. The connection may preferably be carried out positively or by a material connection, by pressing, adhesive bonding, welding, or the like.

A preferred development is that the threaded element is injection-molded on the core element by plastics injection-molding. In this case, the threaded element which is configured as a plastics injection-molded part is injection-molded around the core element. For production, a bar-shaped or rod-shaped core element, which may be configured to be solid or hollow, is incorporated in the thread-shaped mold cavity of an injection-molding machine into which molten thermoplastic material is injected. As a result, the threaded element is generated and at the same time connected by a material connection to the core element.

An advantage of the invention also results during production by injection-molding if the core element according to the invention is formed from a metal material and has a higher thermal conductivity than the threaded element. As a result, the plastics melt may cool and solidify more rapidly, which permits an advantageous reduction in the production time.

It may be provided that the core element has at least one positive connection element which is positively connected to the threaded element. The positive connection element may comprise projections, recesses, surface structures such as roughening, knurling, or the like, in engagement with the threaded element. The positive connection may be generated by the positive connection element being plastically molded in the separately provided threaded element when fastened to the core element. When injection-molding the threaded element by plastics injection-molding, the positive connection element may be directly embedded in the plastics melt, whereby a particularly solid, material and positive connection is generated.

In an advantageous development, it may be provided that a gear wheel is configured at least partially with the threaded element. The threaded element may have a gear wheel or at least parts thereof, for example a hub, or a coaxial toothing, a drive wheel driven by the drive motor of the drive unit engaging therein. As a result, the threaded spindle may be rotatably driven for forming a rotary spindle drive. The gear wheel may be configured entirely or partially in one piece with the threaded element, preferably from the plastics of the threaded element. In the injection-molding method, the gear wheel may be preferably injection-molded in one piece together with the threaded element directly onto the core element.

It may be provided that the threaded spindle has a stop element. A stop element may comprise, for example, a projection protruding radially over the thread, for example an externally configured collar, which may not be screwed through the spindle nut and thereby forms an axial end stop for the translatory movement of the threaded spindle relative to the spindle nut. The stop element may be fixed to the threaded spindle or configured in one piece therewith. The stop element may also be configured on a core element, for example by plastic expansion or shaping of the wall of a tubular core element. Alternatively or additionally, an axial stop may be implemented by suitably molding a plastics injection-molded part, for example of the threaded element.

An adjusting drive designed according to the invention may be used as a longitudinal adjusting drive on a longitudinally adjustable steering column and additionally or alternatively as a vertically adjustable drive on a vertically adjustable steering column. The steering column may additionally have a vertically adjustable drive which may also be designed according to the invention.

The invention further comprises a steering column for a motor vehicle, comprising a supporting unit which is able to be attached to a vehicle body and by which an actuating unit is held, a steering spindle being rotatably mounted therein, and comprising an adjusting drive which comprises a threaded spindle which engages with an external thread in a spindle nut, and a drive unit which is coupled to the threaded spindle or the spindle nut, such that the threaded spindle and the spindle nut are able to be rotatably driven relative to one another, wherein the adjusting drive is connected to the supporting unit or the actuating unit, in which the adjusting drive according to the invention is configured according to one of the above-described embodiments.

The adjusting drive may have at least one coupling portion which may be configured on a threaded spindle. For example, this coupling portion may have a joint head with a fastening bore or other fastening means, which are arranged with corresponding fastening means on the parts of the steering column which are adjustable relative to one another.

Figure 1:
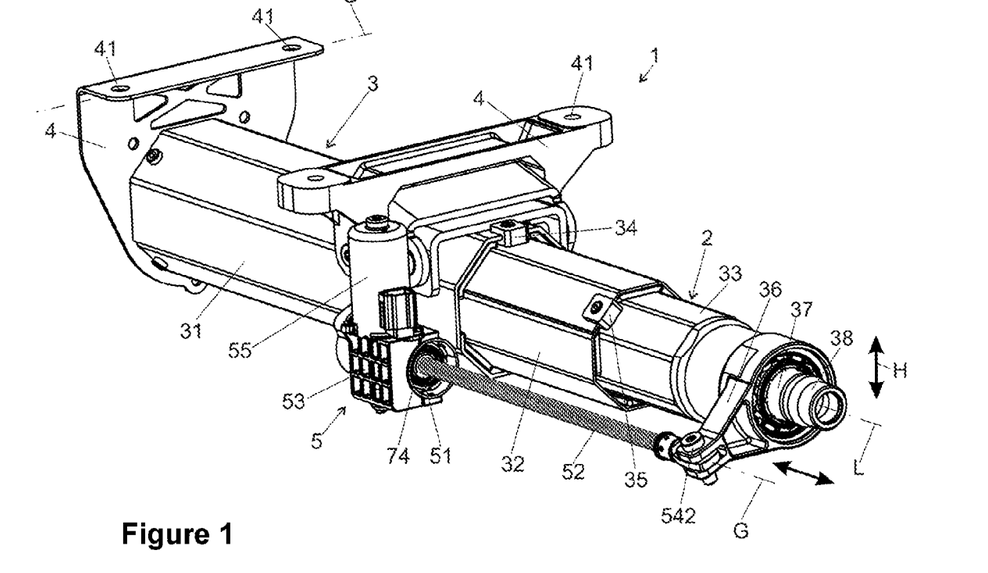
FIG. 1 is a schematic perspective view of an example steering column.
Figure 2:
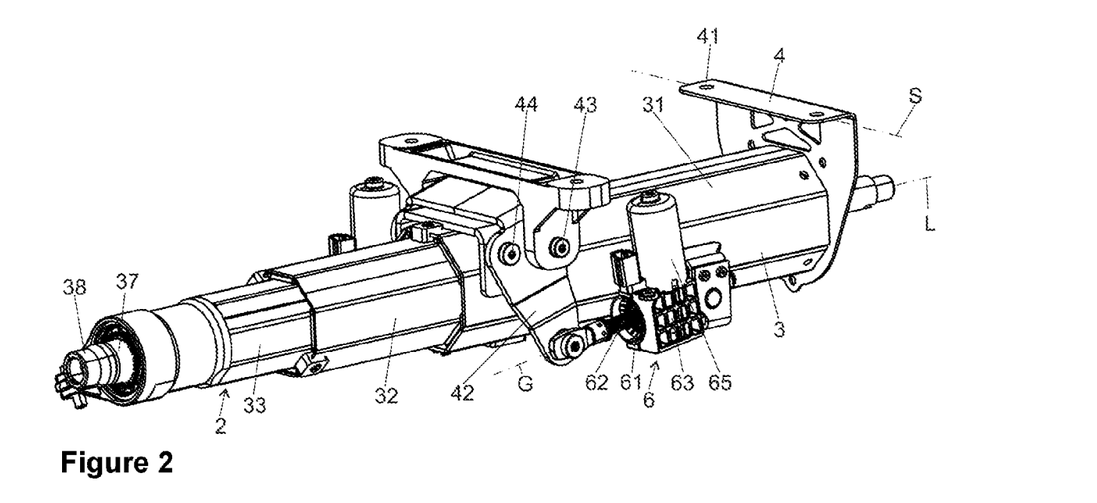
FIG. 2 is a further perspective view of the steering column according to FIG. 1.

FIG. 1 shows a steering column 1 according to the invention in a schematic perspective view from top left, obliquely to the rear end, relative to the direction of travel of a vehicle, not shown, where a steering wheel, not shown here, is held in the operating region. FIG. 2 shows the steering column 1 in a view from the opposing side, i.e. viewed from top right.

The steering column 1 comprises a jacket unit 3 which has an outer jacket tube 31, an intermediate jacket tube 32 and an inner jacket tube 33. The jacket tubes 31, 32 and 33 are axially arranged so as to be adjustable in a telescopic manner coaxially in one another in the axial direction of a longitudinal axis L, as indicated by a double arrow.

A stop 34 is attached to the outer jacket tube 31 on the rear end, said stop at the open end protruding inwardly into the intermediate space between the outer jacket tube 31 and intermediate jacket tube 32. When extended, the intermediate jacket tube 32 strikes axially against the stop 34 and is secured against separation from the outer jacket tube 31. A stop 35 protruding inwardly into the intermediate space between the intermediate jacket tube 32 and the inner jacket tube 33 is attached to the rear end of the intermediate jacket tube 32, said stop securing the inner jacket tube 33 from being pulled out of the intermediate jacket tube 32.

In the jacket unit 3 a steering spindle 37 is rotatably mounted about the longitudinal axis L, said steering spindle having a connecting portion 38 at the rear end thereof for attaching a steering wheel, not shown. The steering spindle 37 is also configured to be telescopable in the longitudinal direction, in the same manner as the jacket unit 3. An actuating unit 2 encompasses the inner jacket tube 33 together with the steering spindle 37 mounted therein. This actuating unit 2 is received so as to be displaceable in a telescopic manner in the outer jacket tube 31 in the direction of the longitudinal axis L for implementing a longitudinal adjustment relative to the jacket unit 3, in order to be able to position the steering wheel connected to the steering spindle 37 forward and back relative to the supporting unit 4 in the longitudinal direction, as indicated by the double arrow parallel to the longitudinal axis L.

The jacket unit 3 is held in a two-part supporting unit 4 which has fastening means 41 for attaching to a vehicle body, not shown.

The jacket unit 3 in its front region is pivotably mounted relative to the vehicle body about a horizontal pivot axis S located transversely to the longitudinal axis L and shown schematically. To this end, a pivot bearing, not shown, is arranged in the supporting unit 4 or between this supporting unit 4 and the vehicle body. In the rear region, the jacket unit 3 is connected via an actuating lever 42 to the supporting unit 2. By a rotational movement of the actuating lever 42 by means of an adjusting drive 6 (see FIG. 2) the jacket unit 3 may be pivoted together with the actuating unit 2 relative to the supporting unit 4 about the pivot axis S located horizontally in the installed state, whereby an adjustment of a steering wheel attached to the fastening portion 38 may be undertaken in the vertical direction H, which is indicated by the double arrow.

A first adjusting drive 5 for the longitudinal adjustment of the actuating unit 2 relative to the jacket unit 3 in the direction of the longitudinal axis L has a spindle drive with a spindle nut 51 with an internal thread 74 extending along a spindle axis G, in which a threaded spindle 52 engages, i.e. is screwed with its external thread in the corresponding internal thread 74 of the spindle nut 51. The threaded spindle axis of the threaded spindle 52 is identical to the spindle axis G and runs substantially parallel to the longitudinal axis L.

The spindle nut 51 is rotatably mounted about the spindle axis G in a bearing housing 53 which is fixedly connected to the outer jacket tube 31 of the jacket unit 4. In the direction of the spindle axis G, the spindle nut 51 is axially supported via the bearing housing 53 on the jacket unit 4. The adjusting drive 5 is accordingly a so-called plunger spindle drive.

The threaded spindle 52 is connected to the inner jacket tube 33 and supported fixedly in terms of rotation and axially fixedly at its free end on an arm 36, and the spindle nut 51 is axially supported via the drive unit 53, i.e. in the longitudinal direction, on the outer jacket tube 31. The longitudinal direction corresponds to the direction of the longitudinal axis L. By a relative rotation by means of the motor 55, which is configured as an electric motor, the threaded spindle 52 and the spindle nut 51 are moved together or apart depending on the rotational direction, whereby the inner jacket tube 33 is axially retracted into the intermediate jacket tube 32 and this intermediate jacket tube is retracted or extended into the outer jacket tube 31, as indicated by the double arrow. As a result, a steering wheel which may be attached to the connecting portion 38 may be moved to the front into a stowed position, in which the inner jacket tube 33 and the intermediate jacket tube 32 are retracted into the outer jacket tube 31, i.e. immersed at the front, or extended into an operating position in the operating region in which the jacket tubes 31, 32 and 33 are extended out of one another in a telescopic manner.

In FIG. 2 which shows a perspective view of the steering column 1 from the side located to the rear in FIG. 1, it may be identified how a second adjusting drive 6 is attached to the steering column 1 for adjusting in the vertical direction H. This adjusting drive 6 is constructed in principle to act in the same manner as the adjusting drive 5. This adjusting drive also comprises a spindle nut 61, a threaded spindle 62 engaging in the internal thread thereof along a spindle axis G. The threaded spindle 62 is mounted in a bearing housing 63, which is fastened to the jacket unit 3, rotatably about the axis G and axially supported in the direction of the axis G on the jacket unit 3, and is able to be driven by an electric drive motor 65 selectively in both rotational directions about the axis G.

In the embodiment shown, the adjusting drives 5 and 6 are so-called plunger spindle drives. Alternatively, a rotary spindle drive may also be configured, in which the spindle nut 51 is held relative to rotation on the steering column 1 and the threaded spindle 52 is able to be rotatably driven by the motor 55.

The adjusting drive 6 acts on the end of the two-arm actuating lever 42 which is rotatably mounted on the supporting unit 4 about a pivot bearing 43, and the other arm thereof is connected to the jacket unit 3 by the other end in a further pivot bearing 44.

Figures 3, 4:
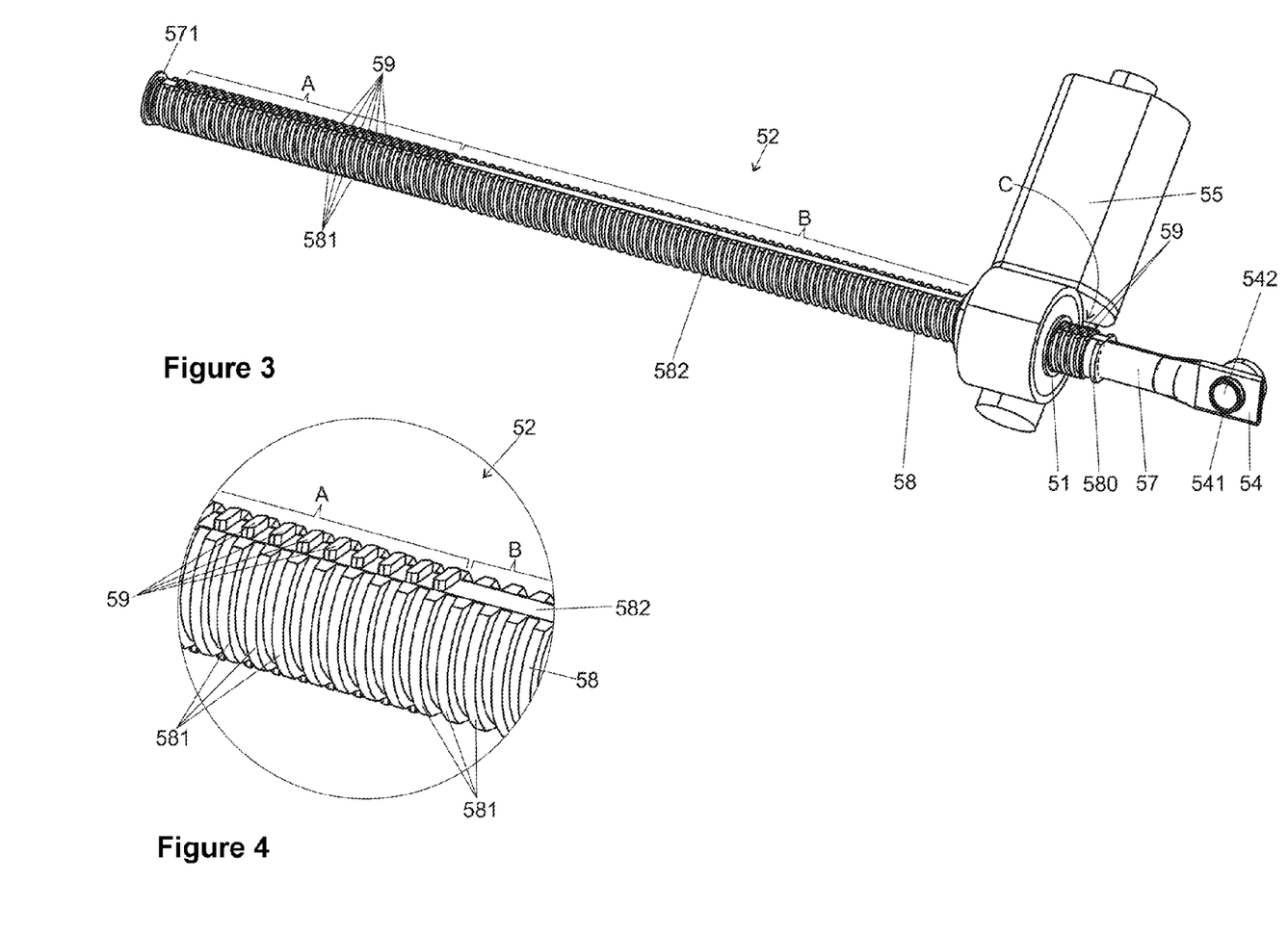
FIG. 3 is a schematic perspective view of an example adjusting drive.
FIG. 4 is an enlarged detail view of a threaded spindle of the adjusting drive according to FIG. 3.
Figure 5:
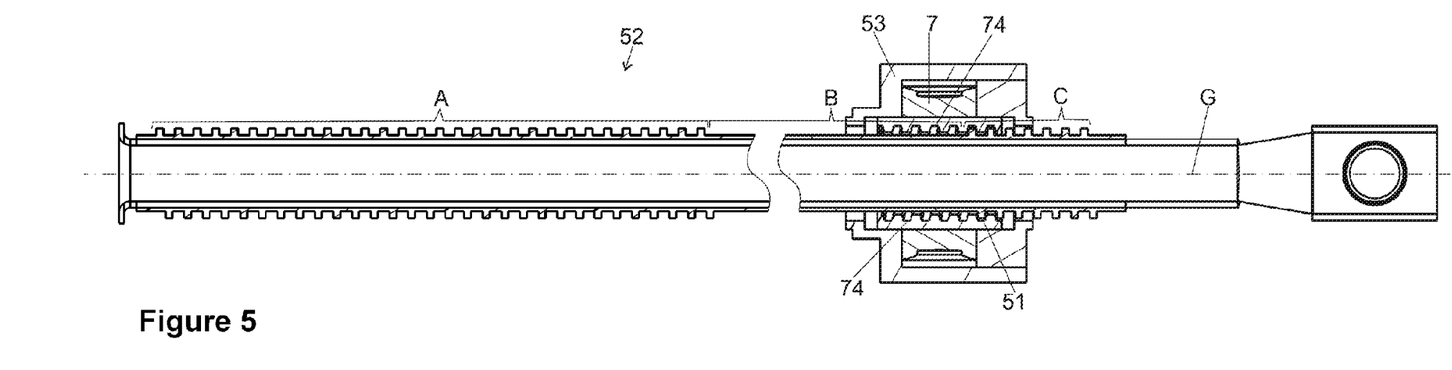
FIG. 5 is a longitudinal sectional view through the adjusting drive according to FIG. 3 along a spindle axis.

The adjusting drive 5 is shown individually in FIG. 3 in a perspective view and in FIG. 5 in a longitudinal section along the spindle axis G.

The threaded spindle 52 according to the invention has a preferably tubular core element 57, preferably made of steel tube, on which coaxially a sleeve-shaped threaded element 58 is unreleasably attached, said threaded element having the external thread with a helically encircling thread tooth 581, and being able to be injection-molded by plastics injection-molding.

For forming a coupling element 54, which serves as such, the tube of the core element 57 is crimped flat, transversely to the spindle axis G, preferably by cold forming, and has a continuous fastening bore 541 perpendicular to the crimping. A fastening bolt 542 is guided through this fastening bore 541 for connecting fixedly in terms of rotation to the transmission element 34, as may be identified in FIG. 1.

At the end remote from the fastening element 54, the core element 57 has a stop element 571 which is configured as a radially outwardly protruding peripheral collar, preferably by widening the tubular core element 57 by cold forming.

At its end facing the fastening element 54, the threaded element 58 also has a stop element 580 which is configured as a peripheral projection or collar, which is configured in one piece with the threaded element by plastics injection-molding.

According to the invention the threaded spindle 52 has a first actuator portion A which, as may be identified in FIG. 3, extends over a longitudinal portion of the external thread. The actuator portion A is located in an end region of the threaded spindle. A longitudinal portion configured as a transition portion B adjoins thereto. Arranged at the other end region of the threaded spindle 52, opposing the actuator portion A, is a second actuator portion C which in principle may be configured in the same manner, wherein the lengths of the actuator portion A and the actuator portion C may be different. Hereinafter, therefore, only the actuator portion A is referred to.

Figure 4A:
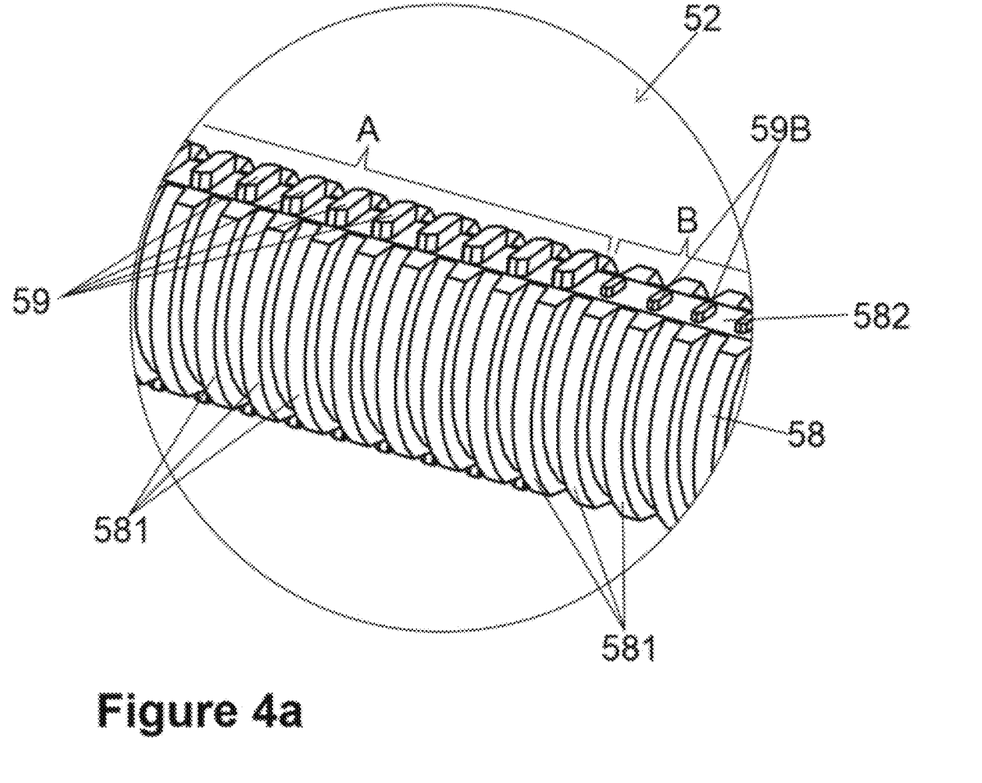
FIG. 4a shows an enlarged detailed view of the threaded spindle of the adjusting drive including a transition pretensioning element.

The threaded element 58 has an axially continuous flattened portion 582 of the external thread, which may be identified clearly in FIG. 4, which shows an enlarged detail of FIG. 3. In the region of this flattened portion 582, the thread tooth 581 in each peripheral portion has a gap in which in each case a pretensioning element 59 is configured in the actuator portion A. The pretensioning elements 59 in the first embodiment of FIG. 4 are configured as radially protruding projections, pads or blocks which in the axial direction (longitudinal direction) may be slightly wider than the peripheral cross section of the thread tooth 581, i.e. wider than the axial width of the thread tooth 581. The pretensioning elements 59 may preferably be configured in one piece by plastics injection-molding with the threaded element 58. By elastic deformation of the plastics material, the pretensioning elements 59 may be resiliently pretensioned or tensioned without clearance in the thread of the internal thread of the spindle nut 51. Pretensioning elements 59 are also arranged in the second actuator portion C, said pretensioning elements being able to be configured to act in the same manner as those in the actuator portion A. A transition pretensioning element 59B, shown in FIG. 4a, exerts a lower pretensioning force in the transition portion B than the pretensioning element 59 in the actuator portion A, so that a reduced screw resistance is still implemented according to the invention.

According to the invention, no pretensioning elements 59 are arranged in the transition region B in the embodiment shown, in other words the transition portion B is configured without pretensioning elements. The gap formed by the flattened portion 582 remains free. This is also able to be identified in the enlarged sectional view of FIG. 6. In the region of the flattened portion 582 the pretensioning elements 59 engage with axial pretensioning in the threads of the internal thread 74 of the spindle nut 61, whereby the threaded spindle 52 is pretensioned in the spindle nut 51. This results in an increased screw resistance, which is greater than in the transition region B in which there is no tensioning or less tensioning due to the lack of pretensioning elements there.

Figure 7:
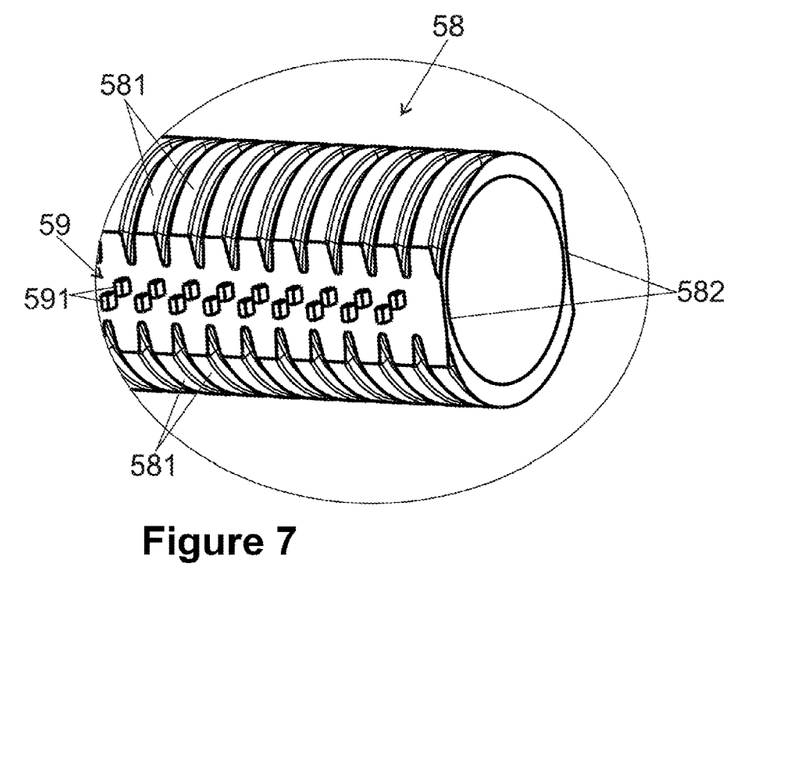
FIG. 7 is a detail view of a second embodiment of an external thread of a threaded spindle in a view similar to FIG. 4.
Figure 8:
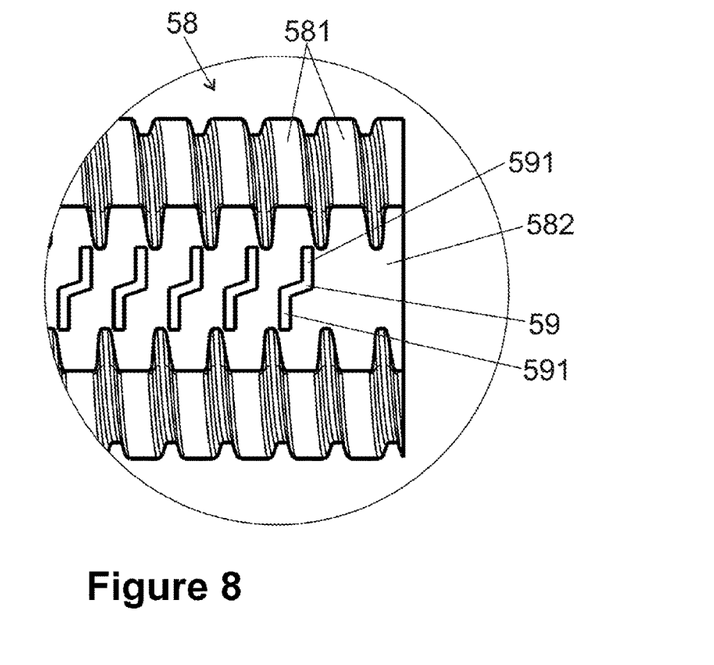
FIG. 8 is a detail view of a third embodiment of an external thread of a threaded spindle.

In FIGS. 7 and 8 further variants of pretensioning elements 59 are shown. The threaded element 58 has in turn at least one, preferably two, opposing flattened portions 582, in which the thread tooth 581 has a gap in the peripheral portion. In the second embodiment of FIG. 7, each pretensioning element 59 has two radially protruding leaf-shaped or finger-shaped spring elements 591 axially spaced apart in the direction of the threaded spindle axis G and in the peripheral direction. These spring elements are able to be elastically bent in the axial direction and in the undeformed state protrude slightly axially over the cross section of the thread tooth 581. As a result, in the screwed-in state in each case they are tensioned in a thread between the thread flanks in the internal thread of the spindle nut 51.

The embodiment shown in a lateral (radial) view in FIG. 8 is configured in a similar manner, wherein each spring element 591 is configured as Z-shaped spring leaf, in which the spring elements 591 in pairs in FIG. 7 are combined in one piece.

All of the embodiments of the spring elements 59, 591 may be configured in one piece on the threaded element 58 by plastics injection-molding. Due to their dimensions, the resilience and the spring force exerted for the pretensioning may be adapted and predetermined, if required. As a result, the size of the screw resistance in the actuator portion A and C may be predetermined in a defined manner.

The free space between the spring elements 591 may be used as a lubricant pocket.

The pretensioning elements 59, 591 may be combined together in any manner. For example, the actuator portions A and C may have pretensioning elements 59, 591 which are different from one another. It is also conceivable and possible that different pretensioning elements 59, 591 may be combined in one actuator portion A, C.

Due to the pretensioning elements 59, 591 an elastic tensioning of the threaded spindle 52 may be generated without clearance in the spindle nut 51, when the spindle nut is located in one of the actuator regions A or C, which correspond to the operating region or the stowing region of the steering column. When stowed, the spindle nut 51 is moved out of the actuator region A. When passing the transition region B the screw resistance due to the lack of tensioning is lower and a greater adjusting speed may be implemented with the same drive power. When reaching the second actuator region C, an increased screw resistance acts once again in the vicinity of the stowed position, as in the actuator region A. A stowage which is safe and without clearance may be carried out at lower adjusting speed. The sequence is correspondingly reversed during deployment from the actuator region C to the actuator region A.

Figure 6:
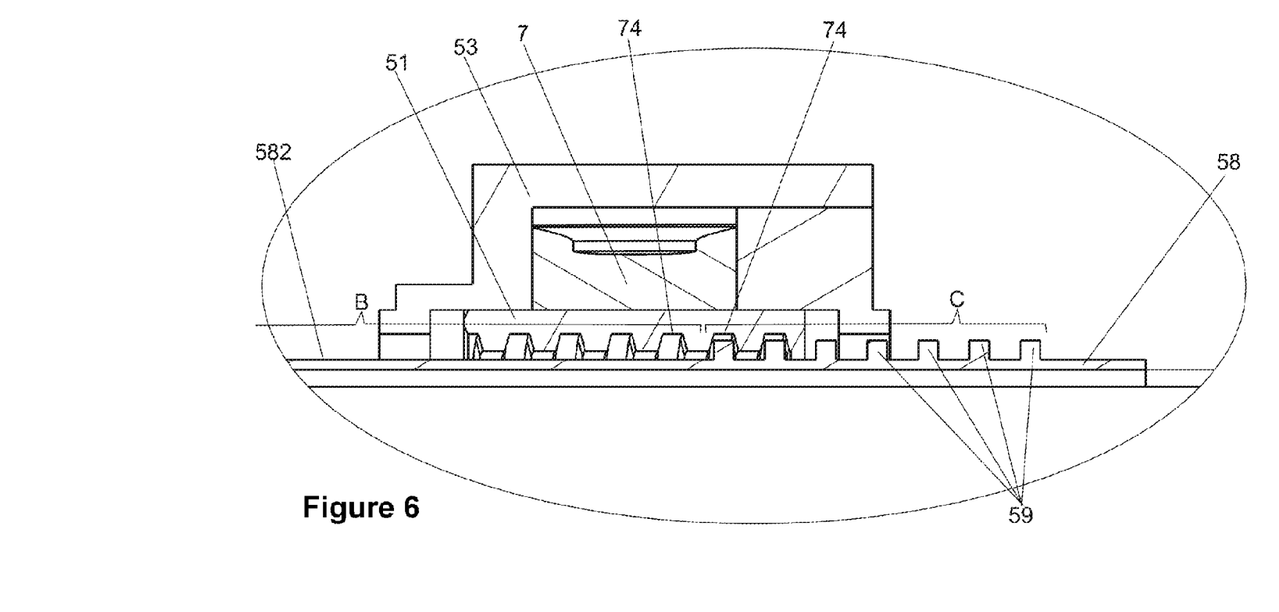
FIG. 6 is an enlarged detail view of FIG. 5.

For the rotating drive by the motor 55, a gear wheel 7 may be attached coaxially on the spindle nut 51, as may be identified in FIGS. 5 and 6. The gear wheel 7 may be, for example, a worm wheel which is in engagement with a worm shaft driven by the motor 55. Alternatively to the design of a plunger spindle drive shown in FIGS. 3 to 6, in which the spindle nut 51 is rotatably driven, in the design of a rotary spindle drive the threaded spindle 52 may be rotatably driven relative to the gear housing 53. Then the gear wheel 7 is fastened fixedly in terms of rotation and coaxially to the threaded spindle 52.

The gear wheel 7 may preferably be configured from plastics, and preferably injection-molded by plastics injection-molding on the spindle nut 51 or the threaded spindle 52.

LIST OF REFERENCE NUMERALS

1 Steering column
2 Actuating unit
21 Fastening means
22, 23 Pivot bearing
3 Jacket unit
31 Outer jacket tube
32 Intermediate jacket tube
33 Inner jacket tube
34, 35 Stop
36 Arm
37 Steering spindle
38 Connecting portion
4 Supporting unit
41 Fastening means
42 Actuating lever
43, 44 Pivot bearing
5, 6 Adjusting drive
51, 61 Spindle nut
52, 62 Threaded spindle
53, 63 Bearing housing
54 Coupling element
541 Fastening bore
542 Fastening bolt
55, 65 Drive motor
57 Core element
571 Stop element
58 Threaded element
580 Stop element
581 Thread tooth
582 Flattened portion
583 Lubricant pocket
59 Pretensioning element
591 Spring element
7 Gear wheel
74 Internal thread
A, C Actuator portion
B Transition portion
L Longitudinal axis
S Pivot axis
H Vertical direction
G Spindle axis (threaded spindle axis)

What is claimed is:

1. An adjusting drive for a steering column for a motor vehicle, comprising:
   a threaded spindle with an external thread that engages in a spindle nut, wherein the threaded spindle has an actuator portion and a transition portion; and a drive unit that is coupled to the threaded spindle or the spindle nut such that the threaded spindle and the spindle nut are able to be rotatably driven relative to one another by overcoming a screw resistance, wherein the transition portion is configured such that the screw resistance of the spindle nut is lower in the transition portion than in the actuator portion, and wherein the actuator portion includes a pretensioning element that is pretensioned against a thread of the spindle nut, wherein the transition portion is free of any pretensioning element or has a transition pretensioning element that is pretensioned against the thread of the spindle nut less than the pretensioning element is pretensioned against the thread of the spindle nut.

2. The adjusting drive of claim 1 wherein the actuator portion is disposed in an end region of the threaded spindle.

3. The adjusting drive of claim 1 wherein the actuator portion is a first actuator portion, wherein the threaded spindle comprises a second actuator portion, with the transition portion being arranged between the first and second actuator portions.

4. The adjusting drive of claim 1 wherein a thread clearance in the transition portion is greater than in the actuator portion.

5. The adjusting drive of claim 1 wherein the pretensioning element is disposed in a tooth profile of a helically circulating thread tooth of the external thread.

6. The adjusting drive of claim 1 wherein the pretensioning element includes a spring element.

7. The adjusting drive of claim 1 wherein the pretensioning element includes a lubricant scraper.

8. The adjusting drive of claim 1 wherein the external thread is configured to at least one of reduce friction in the transition portion or increase friction in the actuator portion.

9. The adjusting drive of claim 1 wherein the threaded spindle includes a core element that is fixedly surrounded at least in some portions in a coaxial direction by a threaded element that comprises the external thread.

10. The adjusting drive of claim 9 wherein the threaded element is comprised of plastic.

11. The adjusting drive of claim 9 wherein the threaded element is an injection-molded part that is disposed on the core element by plastic injection-molding.

12. The adjusting drive of claim 9 wherein the core element is comprised of metal.

13. The adjusting drive of claim 9 wherein the core element includes a positive connection that is positively connected to the threaded element.

14. A steering column for a motor vehicle, comprising:
a supporting unit that is attachable to a vehicle body and by which an actuating unit is held, with a steering spindle being rotatably mounted therein; and
an adjusting drive that comprises:
a threaded spindle with an external thread that engages in a spindle nut, wherein the threaded spindle has an actuator portion and a transition portion, and
a drive unit that is coupled to the threaded spindle or the spindle nut such that the threaded spindle and the spindle nut are able to be rotatably driven relative to one another by overcoming a screw resistance,
wherein the transition portion is configured such that the screw resistance of the spindle nut is lower in the transition portion than in the actuator portion,
wherein the actuator portion includes a pretensioning element that is pretensioned against a thread of the spindle nut, wherein the transition portion is free of any pretensioning element or has a transition pretensioning element that is pretensioned against the thread of the spindle nut less than the pretensioning element is pretensioned against the thread of the spindle nut.

* * * * *